Patented Mar. 24, 1936

2,034,983

UNITED STATES PATENT OFFICE 2,034,983

QUINOLINE DERIVATIVES

Heinrich Jensch, Frankfort-on-the-Main, Germany, assignor to Winthrop Chemical Company, Inc., New York, N. Y., a corporation of New York No Drawing. Application January 23, 1933, Serial No. 653,192. In Germany January 26, 1932

7 Claims. (Cl. 260—38)

The present invention relates to quinoline derivatives.

I have found that the hitherto unknown diamino-quinolines which contain one amino group in the benzene nucleus and the other in the 2- or 4-position and in which the amino groups may be primary or secondary and the amino group contained in the benzene nucleus has as a substituent any desired acyl radical are of a particular importance as very efficacious urine disinfectants and valuable substances for the disinfection of the tissue. The new compounds may be obtained either by introducing in the usual manner a primary or secondary amino group with the aid of the corresponding halogen-, alkoxy-, hydracino-, carbamino- or carbazido-derivatives into the 2- or 4-position of quinolines containing in the benzene nucleus an amino- or an alkylamino-group or the acyl derivatives thereof, or they may be obtained by reducing primary or secondary 2- or 4-aminoquinolines containing a nitro group in the benzene nucleus. The diaminoquinolines obtainable according to the present process may be readily acylated in the amino group contained in the benzene nucleus without affecting the amino group contained in the heterocyclic nucleus, so that the 4- or 2-aminoquinolines containing an acyl-amino-group in the benzene nucleus are also easily accessible by this process.

The new compounds have the following general formula:

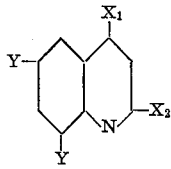

wherein $X_1$ stands for an amino or alkylamino group or for hydrogen, $X_2$ stands for an amino or alkylamino group, methyl or hydrogen at least one X being amino or alkylamino, one Y stands for the group

$Z_1$ being hydrogen or acyl, $Z_2$ being hydrogen or alkyl and the other Y stands for hydrogen. As alkyl groups there may for instance be used the methyl-, ethyl-, propyl- or butyl-groups and as acyl groups acetyl, propionyl, butyryl, benzoyl, cinnamoyl, also radicals of polybasic acids, such as those of carbonic acid, oxalic acid, fumaric acid, succinic acid and the substitution products thereof.

As an acylating agent there may also be used among others cyanuric acid. The new compounds thus obtained show, besides a disinfecting effect an effectiveness in protozoa diseases. As is known, the three acid groups of cyanuric acid are capable of reacting one after the other. It is, therefore, possible to introduce also other groups, such as hydroxyl, alkoxyl, primary, secondary or tertiary amino groups or the like, besides an aminoquinolylamine radical into the cyanuric ring. It is advisable to start from cyanuric chloride and to substitute therein for the chlorine atoms completely or partially in any desired selection and succession the aforementioned radicals in any case, however, for at least one chlorine atom there is substituted an aminoquinolylamine radical.

The following examples serve to illustrate the invention, but they are not intended to limit it thereto:

*1.—4,6-diaminoquinaldine*

4-hydroxy-6-acetaminoquinaldine obtained in the usual manner by the synthesis of Conrad Limpach from para-amino-acetanilide and acetoacetic ester is a colorless, crystalline powder which is soluble in dilute aqueous caustic soda solution; it is converted into 4-chloro-6-acetaminoquinaldine by boiling it with phosphorous oxychloride. 4-chloro-6-acetaminoquinaldine is a colorless powder which is readily soluble in chloroform, ethanol and acetone, but sparingly soluble in petroleum ether; after the recrystallization from acetic ester and a small quantity of ethanol it melts at a temperature of between 208° C. and 209° C. By saponification it yields 4-chloro-6-aminoquinaldine which is readily soluble in chloroform and when recrystallized from acetic ester melts at 170° C. while becoming red.

10 grams of this compound are dissolved in 30 grams of phenol at a temperature of between 120° C. and 130° C. Gaseous ammonia is then introduced for 1 hour at the same temperature into the fused mass, the temperature is then very gradually raised to 190° C. to 200° C. and kept there for about half an hour. The fused mass which has been allowed to cool is then extracted by means of acetone. A yellow residue is obtained which is filtered by suction and dissolved in water. The by-products are precipitated from this solution by means of ammonia; and after filtration there is precipitated from the filtrate by addition of caustic soda solution, the colorless 4-6-diaminoquinaldine. This product crystallizes from water in colorless small needles which contain 1 mol of $H_2O$. On drying on the water-bath the latter escapes and the base then melts at 197° C. The base is readily soluble in dilute acids and on addition of hydrochloric acid constitutes a colorless dihydrochloride which is difficultly soluble in ethanol. Diluted aqueous solutions of the salt have a green fluorescence. The yield amounts to about 70 per cent. of the theory.

2.—4-amino-6-acetaminoquinaldine 60 grams of 4-chloro-6-acetaminoquinaldine are dissolved at about 120° C. in 100 grams of phenol and the solution is then caused to react with ammonia as described in Example 1. The fused mass obtained is cooled, mixed with 200 c. c. of ethanol and after the whole has been allowed to stand for a prolonged time the nearly colorless hydrochloride of 4-amino-6-acetaminoquinaldine crystallizes in a yield of about 45 grams. The salt is readily soluble in water. The colorless base is precipitated in the cold by ammonia. After having been recrystallized from methanol, the base melts at 250° C. When boiled with dilute hydrochloric acid the base is transformed into the compound described in Example 1. By starting from 4-chloro-6-benzoylaminoquinaldine, there can be prepared in the same manner 4-amino-6-benzoylaminoquinaldine.

3.—4-ethylamino-6-aminoquinaldine 24 grams of 6-acetyl-amino-4-chloro-quinaldine are heated for 6 hours in a closed vessel to 180° C. together with 60 c. c. of an alcoholic solution of ethyl amine of about 20 per cent. strength. After cooling, the contents of the vessel is diluted with acetone and the hydrochloride of 4-ethylamino-6-acetylaminoquinaldine which has been formed is filtered by suction. The yield amounts to 23 grams. Without a further purification the product obtained is boiled for 1 hour in the reflux apparatus together with alcoholic-aqueous hydrochloric acid; during this process the dihydrochloride of 4-ethylamino-6-aminoquinaldine separates in form of a colorless bulky mass which is filtered by suction and washed with acetone. In order to obtain the product in a completely pure condition it can be recrystallized from ethanol. The colorless base which has been precipitated from the aqueous solution by an excess of caustic soda solution melts at 195° C. By causing methyl amine or butyl amine, instead of ethyl amine, to act upon 6-acetylamino-4-chloroquinaldine, there is obtained the corresponding 4-methyl- or 4-butyl-amino-6-amino-quinaldine.

4.—4-amino-6-ethylaminoquinaldine 24 grams of 6-acetyl-ethylamino-4-chloroquinaldine (obtainable as described in Example 1 from para-amino-ethylacetanilide in form of a red-brown resin) are treated in 70 grams of phenol with gaseous ammonia as described in Example 1. After the fused mass obtained has been allowed to cool and has been treated with acetone, there remains undissolved a resinous dark salt which is then dissolved in water. The impurities are precipitated from the aqueous solution by carefully adding ammonia and are eliminated by filtration. From the filtrate there is then precipitated by means of caustic soda solution the nearly colorless 4-amino-6-acetylethylaminoquinaldine which after recrystallization from water melts at 221° C. to 222° C. On boiling the base for some hours in a reflux apparatus together with dilute alcoholic hydrochloric acid containing a small quantity of concentrated aqueous hydrochloric acid, the acetyl group is split off and there is obtained the dihydrochloride of 4-amino-6-ethylaminoquinaldine which, after cooling, is filtered by suction and washed with ethanol, being difficultly soluble therein. The yield amounts to 10 grams. The product obtained is very readily soluble in water, to a yellow coloration. Diluted solutions have an intense green fluorescence. The colorless base is precipitated by means of caustic soda solution and melts at 232° C. after having been recrystallized from water and ethanol. 4-amino-6-propylaminoquinaldine and 4-amino-6-butylaminoquinaldine may be prepared in an analogous manner.

5.—4,8-diaminoquinaldine

By subjecting ortho-aminoacetanilide to the reactions mentioned in Example 1 there is obtained, by way of 5-hydoxy-8-acetaminoquinaldine which when recrystallized from water melts at 293° C., 4-chloro-8-acetaminoquinaldine in form of a faintly reddish powder readily soluble in chloroform and after recrystallization from acetic ester and petroleum ether melting at a temperature of between 119° C. and 120° C. The powder is saponified and 4-chloro-8-aminoquinaldine is produced; when recrystallized from ethanol it melts at 112° C.

104 grams of 4-chloro-8-acetylaminoquinaldine dissolved in 310 grams of phenol are caused to react with ammonia as described in Example 1. On addition of acetone to the cooled mass the crude, light grey hydrochloride of 4-amino-8-acetaminoquinaldine remains undissolved in a yield of about 60 grams. This product is dissolved in hot water, the solution is treated with animal charcoal and after the addition of about one third of the volume of concentrated hydrochloric acid the filtrate is heated for 1 to 2 hours on the water bath. On cooling the solution solidifies and forms a colorless crystalline mass, the dihydrochloride of 4.8-diaminoquinaldine. This product is transformed into the base by stirring it with concentrated caustic soda solution; the base is filtered by suction and washed with cold water. The yield amounts to about 40 grams. The 4.8-diaminoquinaldine recrystallized from ethanol melts at 168° C.

6.—4,6-diaminoquinoline

An aqueous solution of 5.5 grams of hydrochloric acid salt of 4-amino-6-nitroquinoline (see "Berichte der Deutschen Chemischen Gesellshaft", vol. 58, page 803) is reduced with 5 grams of iron powder while stirring and heating it on the water bath. After half an hour the solution is filtered in the hot condition, the filtrate is rendered alkaline by addition of ammonia and again filtered. The clear filtrate is then acidified by addition of hydrochloric acid and evaporated. The concentrated solution is then supersaturated with concentrated caustic soda solution, the precipitated crude base is filtered by suction and washed with water. By recrystallization from benzene and a small quantity of ethanol the base is obtained in form of a colorless fine powder which melts and darkens at 215° C. The yield amounts to about 2 grams. The properties of 4-6-diaminoquinoline are very similar to those of the homologue of Example 1. A characteristic feature is the intensive green fluorescence of the diluted weakly acid solutions which disappears on addition of an excess of a mineral acid. The faintly yellow dihydrochloride is readily soluble in water, but difficultly soluble in ethanol.

7.—2,6-diaminoquinoline 11.4 grams of 2-amino-6-nitroquinoline (see "Journal für Praktische Chemie", vol. 93, page 386 and "Berichte der Deutschen Chemischen Gesellschaft", vol. 58, page 806) are reduced at about 40° C. in 150 c. c. of ethanol with palladium and hydrogen. After 3 to 4 hours the reduction is complete. After dissolution is complete due to a more vigorous heating, the solution is separated from the catalyst by filtration, the filtrate is acidified with alcoholic hydrochloric acid and mixed with ether. 13 grams of the dihydrochloride of 2-6-diaminoquinoline are precipitated. In order to purify this product it is dissolved in hot water, the hot solution is rendered weakly alkaline by the addition of ammonia, treated with a small quantity of animal charcoal and filtered, while hot. On cooling, the base crystallizes in form of weakly greyish yellow needles which darken and melt at 219° C. The aqueous solution of the base shows only a weakly alkaline reaction when tested with phenolphthalein, contrary to the 4-6-isomeride. The dihydrochloride is readly soluble in water.

8.—4-amino-6-cinnamoylaminoquinaldine 8.7 grams of 4-6-diaminoquinaldine of Example 1 are dissolved in 50 c. c. of glacial acetic acid. The solution is then mixed, while stirring, with 8.5 grams of cinnamic acid chloride. The mixture becomes slightly hot and the colorless hydrochloride of 4 - amino - 6 - cinnamoylaminoquinaldine soon separates. The product is heated for a short time on the water bath, diluted with ether, filtered by suction and washed with ether. The salt is obtained in a yield of 17 grams. It is readily soluble in gently heated water. The colorless base is precipitated from the solution by means of alkali. After being recrystallized from aqueous ethanol, the base constitutes a crystalline powder which melts at 253° C. to 254° C. It has the following formula:

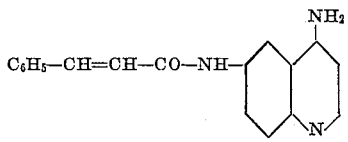

From 4-amino-6-ethylamino-quinaldine described in Example 4 there is obtained in the same manner 4-amino-6-ethyl-cinnamoylaminoquinaldine.

9.—4-amino-8-cinnamoylaminoquinaldine 8.7 grams of 4-8-diaminoquinaldine of Example 5 are treated in a manner exactly similar to that described in Example 8. The yield of colorless hydrochloride amounts to 15 grams. The salt is soluble in hot water; concentrated solutions have a great tendency to gelatinize. The base recrystallized from ethanol is a nearly colorless fine powder which melts at 202° C. to 203° C. From 4-amino-8-methylaminoquinaldine there is obtained in the same manner 4-amino-8-methylcinnamoylaminoquinaldine.

10.—Symmetrical di-(4-aminoquinaldyl-6)-urea 10 grams of 4-6-diaminoquinaldine are stirred into about 20 times the quantity of water, while heating on the water bath. A small quantity of sodium acetate is added and phosgene is introduced until dissolution is complete. After the solution has been acidified with hydrochloric acid and a saturated solution of sodium chloride has been added, the colorless hydrochloride of diaminoquinaldyl-urea separates and is filtered by suction and washed with dilute hydrochloric acid. The product is readily soluble in hot water. The colorless base is precipitated from the solution by means of ammonia. The base recrystallized from butyl alcohol darkens and melts at 255° C. while foaming. The dichloromethylate melts at 300° C. while foaming and has the following formula:

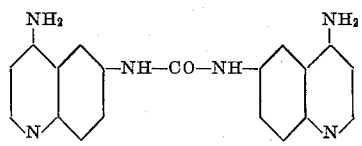

11.—Symmetrical di-(2-methyl-4-aminoquinolyl-6)-oxamide

Into a solution of 10.3 grams of 4-6-diaminoquinaldine in 50 c. c. of glacial acetic acid 3.8 grams of oxalylchloride are added, while stirring. With evolution of heat there is formed a colorless magma of the dihydrochloride of the symmetrical di-(2-methyl-4-aminoquinolyl-6)-oxamide. The magma is diluted with ether, then filtered by suction, dissolved in hot water and the solution is acidified with dilute hydrochloric acid and mixed with a solution of sodium chloride. During this process the dihydrochloride separates, it is filtered by suction after cooling and washed with dilute hydrochloric acid. The yield amounts to 12 grams. The salt is readily soluble in hot water. The base precipitated from the solution by means of alkali is a colorless powder when dried. This powder is soluble in a very large quantity of hot alcohol. The product does not alter when heated to 300° C. It has the following formula:

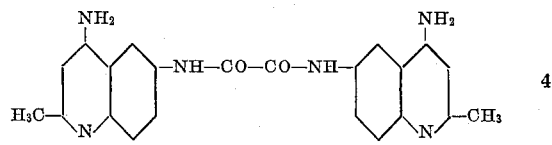

12.—Symmetrical di-(2-methyl-4-aminoquinolyl-6)-fumaric acid amide 12.9 grams of 4,6-diaminoquinaldine dissolved in 100 c. c. of glacial acetic acid are mixed, while stirring, with 5.7 grams of fumeric acid chloride. By heating a bulky faintly yellowish magma is formed. The magma is heated for a short time on the water bath, diluted with ether, filtered by suction and washed with ether. 18.5 grams of the dihydrochloride of the symmetrical di-(2-methyl-4-aminoquinolyl-6)-fumaric acid amide are obtained in form of a yellowish powder. It can be purified by dissolving it in hot water and precipitating it by means of a solution of sodium chloride. The compound is rather readily soluble in water. The base precipitated by means of ammonia has a yellow color and melts at 259° C., while foaming. It is practically insoluble in the usual solvents.

13.—Symmetrical di-(2-methyl-4-aminoquinolyl-6)-malonic acid amide 7.22 grams of malonyl chloride are added, while stirring to 17.7 grams of 4,6-diaminoquinaldine in 100 c. c. of glacial acetic acid. The mass becomes quite hot and on cooling yields first a resinous precipitate which becomes solid on kneading with ether. In order to purify the product it is dissolved in hot water and precipitated again by means of a solution of sodium chloride. The dihydrochloride of the symmetrical di-(2-methyl-4-amino-quinolyl-6)-malonic acid amide obtained in a yield of about 12 grams is practically colorless and rather readily soluble in water to a yellow solution. The practically colorless base is readily soluble in hot alcohol. After having been recrystallized from alcohol it gradually decomposes at 216° C. while foaming. It has the following formula:

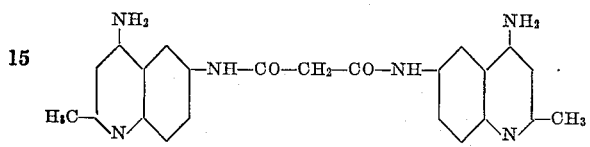

14.— (2-methyl-4-aminoquinolyl-6)-dichlorcyanuramide 10.5 grams of 4.6-diaminoquinaldine in form of the base as obtained according to Example 1 are dissolved in 60 c. c. of glacial acetic acid and the solution is gradually poured, at a temperature of between 10° C. and 15° C., while stirring, into a solution of 12 grams of cyanuric chloride in 100 c. c. of glacial acetic acid. During this process the hydrochloride of (2-methyl-4-aminoquinolyl-6)-dichlorcyanuramide is formed in form of a colorless precipitate which is filtered by suction and washed with glacial acetic acid and ether; the yield amounts to 20 grams. The compound does not alter when heated to 300° C. except that it becomes faintly red. Above 100° C. acetic acid is split off. The compound is readily soluble in water. The base is precipitated from this solution in the form of a jelly by means of sodium carbonate.

The same compound can also be obtained in form of the hydrochloride by adding 1 mol of diaminoquinaldine dissolved in acetone at about 0° to the ethereal solution of 1 mol of cyanuric chloride. The yield nearly corresponds with the theory. The compound has the following formula:

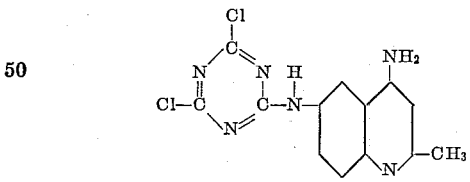

15.—2-methyl-4-aminoquinolyl-6-melamine 10 grams of the hydrochloride of (2-methyl-4-aminoquinolyl-6)-dichlorcyanuramide of the preceding example are heated for 3 hours to a temperature of between 120° C. and 125° C. together with 50 c. c. of alcoholic ammonia. The contents of the tube is then evaporated to dryness. The residue obviously constituting a hydrochloride of the 2-methyl-4-aminoquinolyl-6-melamine is extracted with water and the hot extract is mixed with about the same volume of a saturated solution of sodium chloride. On cooling, the hydrochloride is separated, filtered by suction and washed with a small quantity of aqueous acetone and then with pure acetone. The yield amounts to 6 grams. The salt is readily soluble in water to a neutral reaction. It is likewise readily soluble in 2 normal hydrochloric acid, leaving a smeary residue. The colorless base is precipitated by means of caustic soda solution and after recrystallization from water and ethanol is obtained in form of a fine powder. The base darkens and melts at 267° C., and has the following formula:

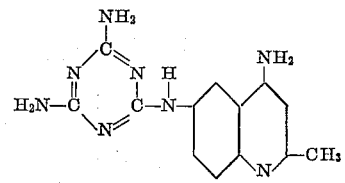

16.—3.5 grams of 4,6-diaminoquinaldine are dissolved at about 120° in 35 c. c. of nitrobenzene. After the addition of 3 grams of chlorcyanurdiamide (see "Berichte der Deutschen Chemischen Gesellschaft, vol. 32, page 695) the temperature is maintained for about 3 hours at 150° C., while stirring. After cooling, the solution is mixed with ether, the precipitate which is formed is filtered by suction and boiled with dilute acetic acid; the extract is rendered alkaline by the addition of ammonia. The crude base precipitated thereby can be purified by a repeated recrystallization from water and ethanol and is identical with the compound described in Example 15.

17.—N₁-N₂-di-(2-methyl-4-aminoquinolyl-6)-chlorcyanurdiamide 19 grams of 4,6-diaminoquinaldine dissolved in 150 c. c. of glacial acetic acid are mixed, while stirring, at water bath temperature with 10 grams of cyanuric chloride. There is obtained a colorless magma which after having been heated for about 2 hours is filtered by suction and washed with hot glacial acetic acid and ether. The colorless fine powder constitutes the dihydrochloride of N₁-N₂-di-(2-methyl-4-aminoquinolyl-6)-chlorcyanurdiamide containing 2 mols of acetic acid in the bound condition which are separated only above 100° C. The compound dissolves in boiling water, concentrated solutions gelatinize on cooling. The salt is also soluble in methanol. It does not melt when being heated up to 300° C. The gelatinous base is insoluble in water, but soluble in ethanol. It does not melt when heated up to 360° C. but gradually darkens at about 300° C., and has the following formula:

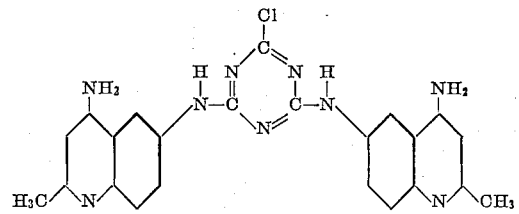

18.—N₁-N₂-di-(2-methyl-4-aminoquinolyl-6)-melamine 25 grams of the dihydrochloride obtained according to the preceding example are heated for 3 hours to a temperature of between 120° and 125° C. together with 125 c. c. of alcoholic ammonia. The contents of the bomb is then evaporated to dryness, the residue, apparently a hydrochloride of the above-mentioned base, is dissolved in a large quantity of hot water, the solution is filtered so as to obtain it in a clear state, then acidified with hydrochloric acid and mixed hot with a solution of sodium chloride. During this process the hydrochloride of the new base is separated in form of a practically colorless resin which after solidifying is reduced to small pieces, filtered from the liquid by suction, washed with dilute hydrochloric acid and finally with acetone. The yield amounts to 18 grams. The resin dissolves in water to a nearly colorless viscid solution which has a weakly acid reaction and is capable of being readily salted out. The base constitutes a nearly colorless jelly-like mass which can be purified only with difficulty. Its melting point cannot be exactly determined, but the base decomposes at about 245° C. while forming a foaming mass. The base is obtained in two forms; in the one form it is very readily soluble in methanol, in the other form it is soluble therein only with great difficulty. The base may pass from one form into the other. It similarly behaves also towards ethanol. Litmus paper introduced into the aqueous methanol solution of the base assumes a blue color; the aqueous methanol solution of the base shows, however, no alkaline reaction when tested with phenolphthalein.

19.—14 grams of 4,6-diaminoquinaldine dissolved at about 100° C. and 50 c. c. of nitrobenzene are mixed, while stirring, with 3.5 grams of aminocyanurdichloride (see "Berichte der Deutschen Chemischen Gesellschaft", vol. 32, page 695). The temperature is then raised to 150° C. and maintained there for a short time. After cooling, the mixture is diluted with a small quantity of ether and the precipitate obtained is filtered by suction. The precipitate is dissolved in hot dilute acetic acid, the solution is acidified by hydrochloric acid and mixed with a solution of sodium chloride. The salt thus obtained is purified by again dissolving in it water, filtering the solution and precipitating it. The properties and behaviour of the compound correspond to those obtained in Example 18.

20.—*Symmetrical cyanuric acid-di-(2-methyl-4-aminoquinolyl-6)-diamide*

300 c. c. of 2 normal hydrochloric acid containing 25 grams of the chlorine compound described in Example 17 are boiled for about half an hour in a reflux apparatus. After cooling, the dihydrochloride of the above mentioned compound obtained is filtered by suction and washed with acetone. The yield amounts to 20 grams. The product is readily soluble in hot water, the solution is viscid. The colorless base is soluble in an alcoholic aqueous caustic soda solution, it is however, precipitated again by a large quantity of water. It is soluble in a large quantity of alcohol on boiling for a prolonged time. It decomposes and darkens at about 290° C. and has the following formula:

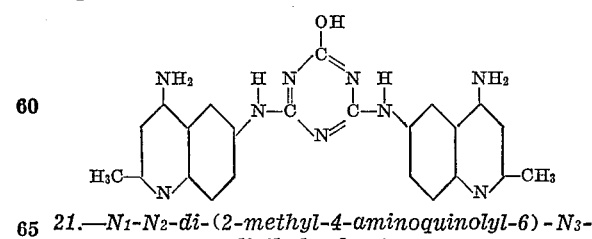

21.—*N₁-N₂-di-(2-methyl-4-aminoquinolyl-6)-N₃-diethylmelamine*

6 grams of the chlorine compound of Example 17 are heated for 3 hours to a temperature of between 120° C. and 125° C. together with 25 c. c. of alcohol and 5 grams of diethylamine. The contents of the tube is then evaporated to dryness and the residue extracted with water which has been acidified with a small quantity of hydrochloric acid. A solution of sodium chloride is added to the hot solution and the hydrochloride of the new base separated thereby is filtered by suction and washed with dilute hydrochloric acid and acetone. The hydrochloride is liquefied when heated on the water bath with loss of water and solidifies again to form a grey brittle mass. The yield amounts to 5.5 grams. The product is readily soluble in water. The colorless base precipitated from the solution by means of ammonia can be recrystallized from alcohol. It then melts at 215° C. to 220° C. and has the following formula:

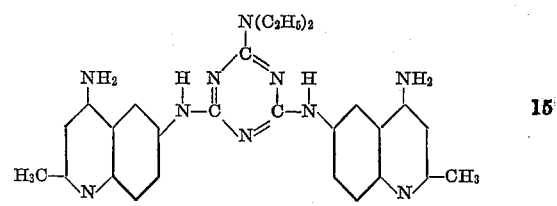

22.—*N₁-N₂-di-(2-methyl-4-aminoquinolyl-6)-N₃-β-diethylaminoethyl-melamine*

15 grams of the chlorine compound of Example 17 are heated for 3 hours to 125° C. together with 60 c. c. of alcohol and 17 grams of β-diethylaminoethylamine. The contents of the tube is then separated from the main quantity of the alcohol and the remaining jelly-like mass is dissolved in hot water, while adding a small quantity of acetic acid, a clear solution being obtained. The solution is mixed, while stirring, with concentrated caustic soda solution and the colorless base which has separated is filtered by suction and washed with water. It is obtained in a yield of 15.5 grams. The base is dissolved in methanol wherein it is readily soluble, the solution is freed by filtration from the hydroxy-compound of Example 20 which is present in a small quantity, and then acidified with alcoholic hydrochloric acid. After a temporary dissolution the hydrochloride of the new base is separated during this process in form of a very fine powder which, after the addition of ether, is filtered by suction. The powder is colorless and readily soluble already in cold water. The solution can be rendered alkaline to litmus paper by the addition of a solution of sodium carbonate without precipitation occurring. The aqueous alcoholic solution of the base shows a distinct alkaline reaction when tested with phenolphthalein. The base is likewise readily soluble in ethanol. It decomposes gradually at about 200° C., while foaming, the decomposition begins already at 170° C. The base has the following formula:

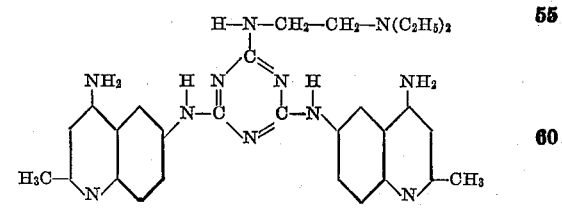

23.—*N₁-(2-methyl-4-aminoquinolyl-6)-di-aminocyanurchloride*

17.5 grams of 4,6-diaminoquinaldine are dissolved in 200 c. c. of ethanol and the solution is mixed, while stirring, with 16.5 grams of aminocyanurdichloride. The mixture is heated for two hours on the water bath and a colorless crystalline precipitate is obtained which is filtered by suction and washed with ethanol. It constitutes the hydrochloride of the above mentioned base and is obtained in a yield amounting to 31.5 grams. The salt is difficultly soluble in water.

The base which may be recrystallized from ethanol shows no visible alteration when being heated up to 300° C. By heating it together with alcoholic ammonia to 120° C., there is obtained 2-methyl-4-aminoquinolyl - 6 - melamine described in Example 15. On heating the product with 4.6-diaminoquinaldine in an alcoholic solution to 120° C. there is obtained the compound described in Example 18 in a very good yield.

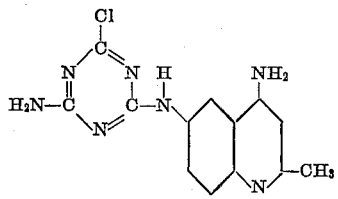

24.—di-(2-methyl-4-aminoquinolyl-6-amino) cyanuric acid ethyl ester 11.5 grams of the dihydrochloride described in Example 17 which has been dried at 110° C. in the vacuum are introduced into a solution of 1.4 grams of sodium in 70 c. c. of absolute alcohol. The mixture is boiled for 3 hours in a reflux apparatus and a colorless magma is obtained which is poured into ice water. The colorless base of the above-mentioned composition is filtered by suction and washed with water. The yield amounts to about 9 grams. The base is readily soluble in alcohol and separates, after having been allowed to stand for a prolonged time, having become sparingly soluble in alcohol. It begins to sinter at about 200° C. and is transformed into a foaming mass at 235° C. When being further heated, the mass becomes a fine red. The hydrochloride is rather readily soluble in water. The base has the following formula:

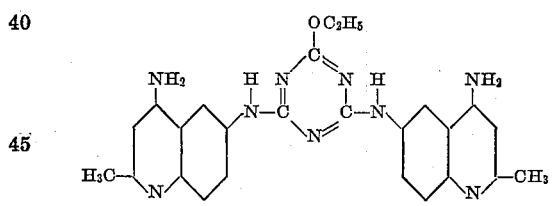

I claim:
1. The products of the following formula:

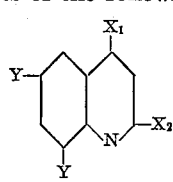

in which $X_1$ stands for an amino or alkylamino group or for hydrogen, $X_2$ stands for an amino or alkylamino group, methyl or hydrogen at least one X being amino or alkylamino, one Y stands for the group

$Z_1$ being hydrogen or acyl, $Z_2$ being hydrogen or alkyl and the other Y stands for hydrogen, said products showing valuable therapeutic properties.

2. The products of the following formula:

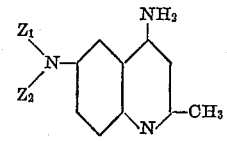

in which $Z_1$ stand for the radical of an organic carboxylic acid and $Z_2$ stands for alkyl or hydrogen, said products showing valuable therapeutic properties.

3. The products of the following formula:

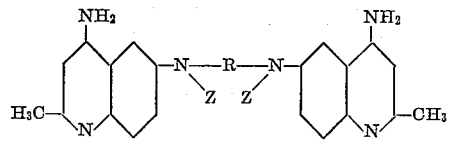

in which R stands for the radical of an organic carboxylic polybasic acid, and Z stands for alkyl or hydrogen, said products showing valuable therapeutic properties.

4. The products of the following formula:

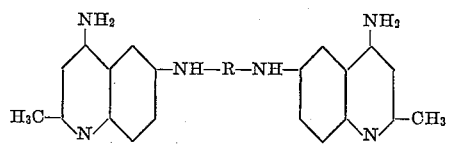

in which R stands for the radical of an organic carboxylic polybasic acid, said products showing valuable therapeutic properties.

5. The product of the following formula:

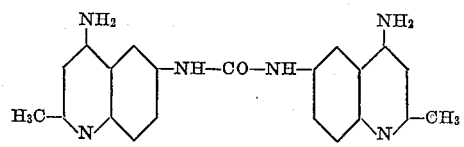

being a colorless powder and melting at about 255° C. with decomposition, said product showing valuable therapeutic properties.

6. The product of the following formula:

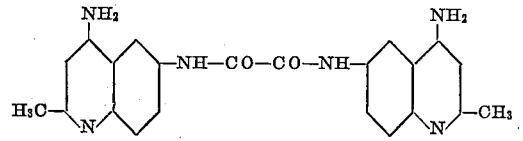

being a colorless powder, soluble in a large quantity of hot alcohol, said product showing valuable therapeutic properties.

7. The product of the following formula:

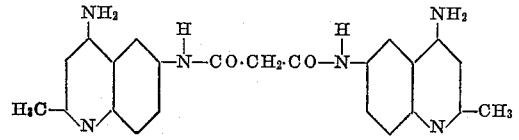

being colorless, soluble in hot alcohol, decomposing at 216° C. while foaming.

HEINRICH JENSCH.